United States Patent
Al-Amri et al.

(10) Patent No.: US 10,351,180 B2
(45) Date of Patent: Jul. 16, 2019

(54) VISCOUS DRAG REDUCTION APPARATUS FOR VEHICLES

(71) Applicant: Imam Abdulrahman Bin Faisal University, Dammam (SA)

(72) Inventors: Fahad Ghallab Al-Amri, Dammam (SA); Muhammad Umar Siddiqui, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 106 days.

(21) Appl. No.: 15/673,772

(22) Filed: Aug. 10, 2017

(65) Prior Publication Data
US 2019/0047640 A1    Feb. 14, 2019

(51) Int. Cl.
*B62D 35/00* (2006.01)
*F15D 1/10* (2006.01)
*G01M 9/06* (2006.01)

(52) U.S. Cl.
CPC ............ *B62D 35/001* (2013.01); *F15D 1/10* (2013.01); *G01M 9/065* (2013.01)

(58) Field of Classification Search
USPC .......................................................... 701/36
See application file for complete search history.

(56) References Cited

U.S. PATENT DOCUMENTS

| | | | | |
|---|---|---|---|---|
| 4,262,954 A | * | 4/1981 | Thompson | B62D 35/005 296/91 |
| 4,502,724 A | * | 3/1985 | Grenadier | B60K 16/00 296/180.1 |
| 6,926,346 B1 | * | 8/2005 | Wong | B62D 35/001 296/180.5 |
| 8,770,649 B2 | | 7/2014 | Praskovsky et al. | |
| 9,139,399 B2 | | 9/2015 | Hidaka et al. | |
| 2008/0309121 A1 | | 12/2008 | Campbell | |
| 2018/0015967 A1 | * | 1/2018 | Brereton | B62D 35/001 |

FOREIGN PATENT DOCUMENTS

CN      103527575      12/2016

* cited by examiner

*Primary Examiner* — Adam D Tissot
(74) *Attorney, Agent, or Firm* — Oblon, McClelland, Maier & Neustadt, L.L.P.

(57) ABSTRACT

Described herein are a viscous drag reduction apparatus and a method. The apparatus includes a pair of rollers connected to a supporting surface on a roof of the vehicle, a belt having a frictional surface and partially wrapped around the pair of rollers, such that the pair of rollers allow the belt to rotate in response to an air flow generated around the vehicle when the vehicle is in motion, the pair of rollers having a length in an axial direction that is at least as long as a width of the belt, an assembly of the pair of rollers and the belt being at least partially recessed with respect to a top line of the roof, and a reverse flow cover connected to the front end of the roof of the vehicle to block an air back flow generated by the belt when rotating.

10 Claims, 9 Drawing Sheets

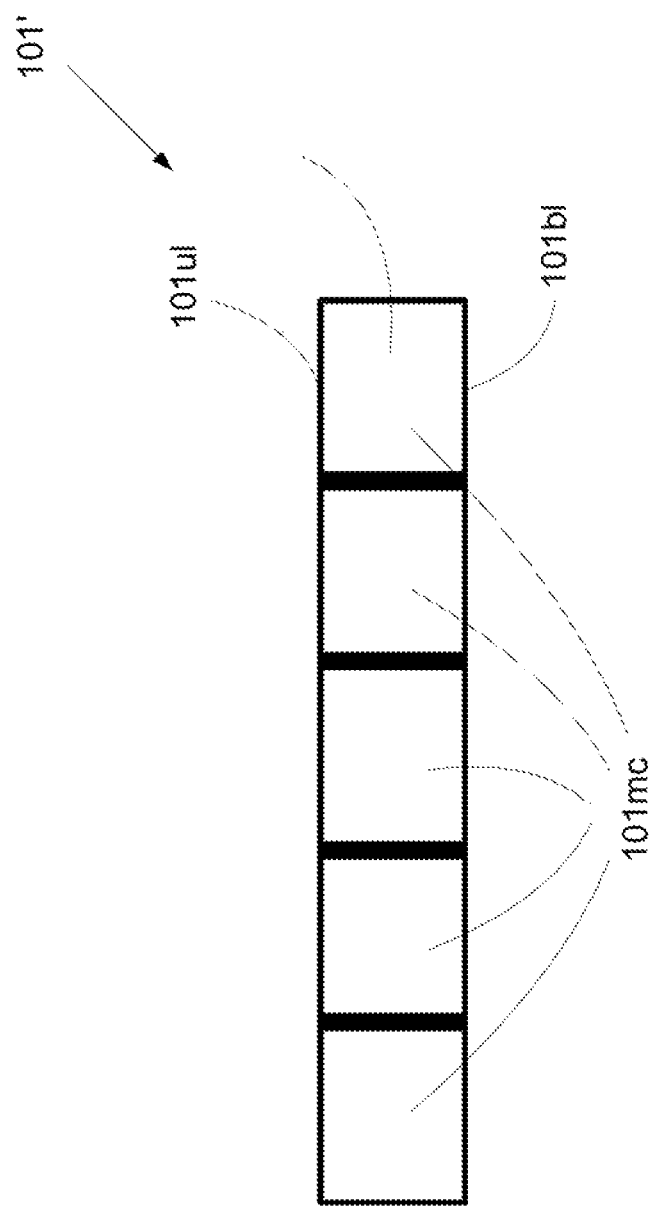

VISCOUS DRAG REDUCTION APPARATUS FOR VEHICLES

BACKGROUND

Field of the Disclosure

This disclosure relates generally to improvements to a vehicle. More particularly the present disclosure relates to improvements relating to reducing drag forces acting on a vehicle and reducing overall fuel consumption of the vehicle used for large scale and/or small scale transportation.

Description of the Related Art

With the ongoing depletion of fossil fuel reserves, there is a need to establish ways for effective and efficient utilization of available fuel. Transportation via cars, buses, trains, airplanes, etc. heavily depend on non-renewable fuel. Thus, ways to make fuel utilization more efficient is highly desired for a transportation sector.

The fuel utilization or fuel consumption of transportation vehicles depends upon several factors including a viscous drag resistance (or force). The viscous drag force is generated due to the skin friction which is caused by the friction experienced by a vehicle moving through air. When the vehicle accelerates through the air, layers of air resist the motion of the vehicle generating an aerodynamic viscous drag which tends to decelerate the vehicle. Such drag forces are overcome by the vehicle by expending extra energy via excess fuel consumption. Although the contribution of viscous drag force can be small for average light vehicles, the contribution of viscous drag force strongly depends on the actual shape and size of the vehicle.

Currently, the reduction of the viscous drag resistance of transportation vehicles can be achieved by modifying the shape of the transportation vehicle, making it more streamline wherever possible. However, modifying the shape of the vehicle may not be possible in many cases, for example, for vehicles having large contact area with the air such as a train or a truck.

Transportation vehicles are used for both large scale and small scale transportation of masses over large and small distances. These vehicles are mostly powered by fuel which cost money. The fuel consumption of such transportation vehicles depend upon the viscous drag force, along with other factors, generated due to the movement of such vehicles. The larger the viscous drag force generated, the larger will be the fuel consumption of the vehicle. Therefore, for an energy efficient design, it is desirable to design transportation vehicle such that less viscous drag force is generated during transportation thereby reducing the fuel consumption.

SUMMARY

According to an embodiment of the present disclosure, there is provided a viscous drag reduction apparatus. An apparatus includes a pair of rollers connected to a supporting surface on a roof of the vehicle, a belt having a frictional surface and partially wrapped around the pair of rollers, such that the pair of rollers allow the belt to rotate in response to an air flow generated around the vehicle when the vehicle is in motion, the pair of rollers having a length in an axial direction that is at least as long as a width of the belt, an assembly of the pair of rollers and the belt being at least partially recessed with respect to a top line of the roof, and a reverse flow cover connected to the front end of the roof of the vehicle and extending to a top of the belt so as to block an air back flow generated by the belt when rotating, the shape of the reverse flow cover being angled at less than 90 degrees with respect to supporting surface and tilting in a backward direction with respect to a moving direction of the vehicle.

The apparatus further includes a plurality of bearing supports firmly attached to the supporting surface, and the pair of rollers rotatably connected to the bearing supports.

The apparatus further includes a motor connected to the pair of rollers, a wind speed sensor measuring a wind speed around the vehicle, and a drag controller configured to receive the wind speed from the wind speed sensor and a vehicle speed from the vehicle, determine an optimum belt speed of the belt based on the wind speed and the vehicle speed, and transmit a speed control signal to the motor.

Further, according to an embodiment of the present disclosure, there is provided a method for viscous drag reduction using a viscous drag reduction apparatus including a pair of rollers, a belt wrapped around the pair of rollers, a motor connected to the pair of rollers, and a wind speed sensor measuring a wind speed around a vehicle. The method includes receiving, via processing circuitry, the wind speed from the wind speed sensor and a vehicle speed from the vehicle, determining, via the processing circuitry, an optimum belt speed of the belt based on the wind speed and the vehicle speed, and transmitting, via the processing circuitry, a speed control signal to the motor.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale.

Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIG. 1D is a cross-section of a multilayered belt according to certain aspects of the present disclosure;

DETAILED DESCRIPTION

Figure 1A:
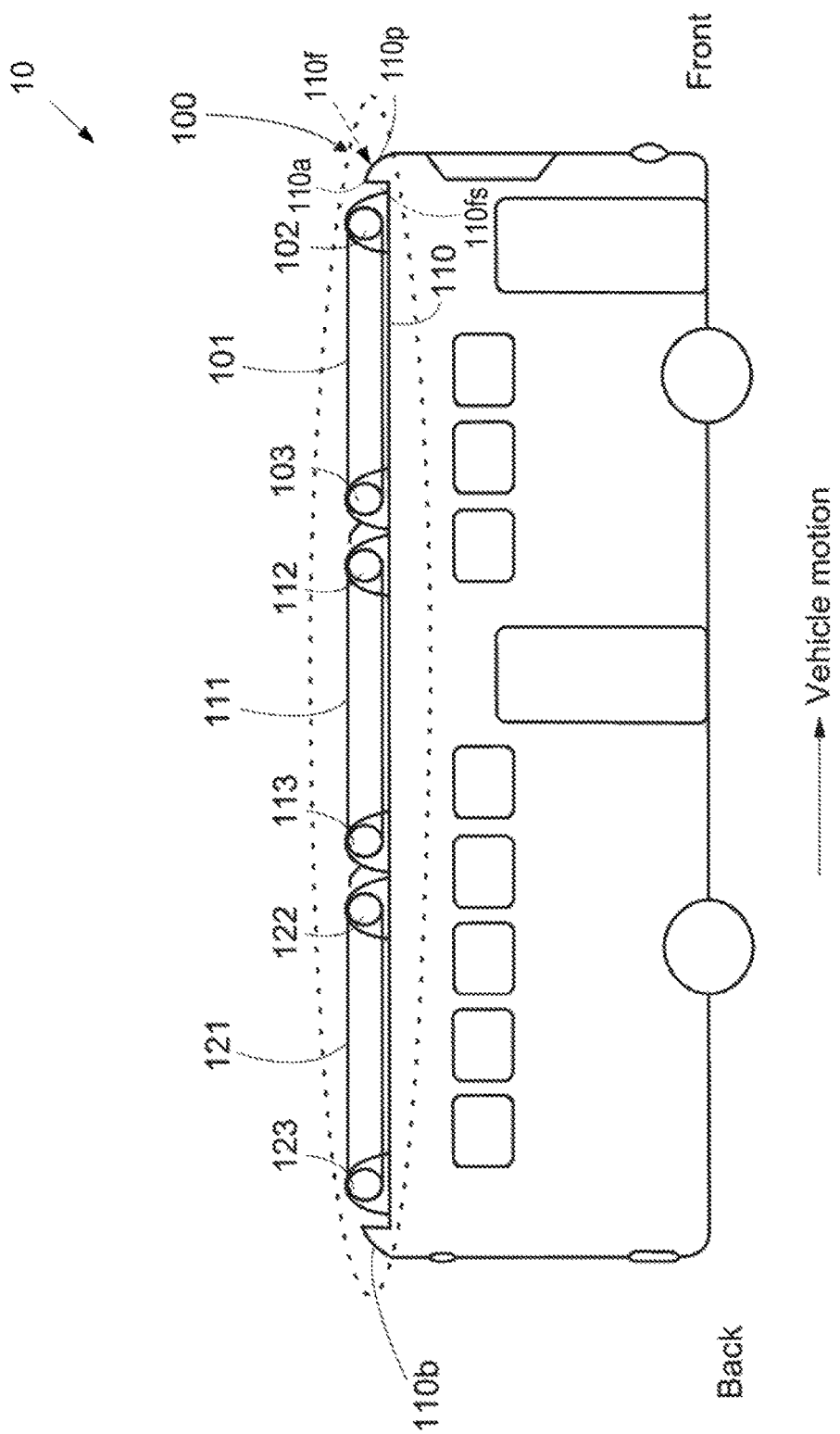
FIG. 1A illustrates a vehicle with a viscous drag reduction apparatus according to certain aspects of the present disclosure.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details. In some instances, well-known structures and components may be shown in block diagram form in order to avoid obscuring the concepts of the disclosed subject matter.

It is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "proximate," "minor," and similar terms generally refer to ranges that include the identified value within a margin of 20%, 10% or preferably 5% in certain embodiments, and any values therebetween.

Typically, a vehicle such as a bus or a transportation truck has a smooth and slightly arched, but relatively flat roof. A typical vehicle with a smooth roof will experience continuous viscous drag resistance (also referred as drag force) during movement due to the air flowing around the vehicle including the roof. The vehicle overcomes such drag resistance by burning more fuel, thus reducing the fuel efficiency of the vehicle. Additionally, burning more fuel causes air pollution.

To mitigate the adverse effects of viscous drag resistance, the present disclosure introduces a viscous drag reduction apparatus. In addition to mitigating viscous drag resistance, in certain embodiments the viscous drag reduction apparatus also helps to harness the viscous drag forces and apply them to a useful purpose. Moreover, the viscous drag reduction apparatus can reduce the viscous drag resistance (or force) at a roof of the vehicle or other surfaces (e.g., side faces) caused by the air flow when the vehicle is moving. The air flow generates a friction on the viscous drag reduction apparatus that sets the viscous drag reduction apparatus in motion thereby reducing the viscous drag at the roof of the vehicle or other surfaces (e.g., side faces). Thus, the viscous drag reduction apparatus can be used to improve the fuel efficiency of the vehicle and reduce air pollution. Furthermore, the motion of the viscous drag reduction apparatus can be converted to an electric energy which can be used to charge batteries. Thus, the drag resistance generated by the air flow can be converted to useful energy.

The viscous drag reduction apparatus is different from a typical drag reduction approach where the vehicle is aerodynamically designed to reduce negative effects of the viscous drag resistance. On the contrary, the viscous drag reduction apparatus does not need an aerodynamically designed vehicle. The viscous drag reduction apparatus can be retro-fitted on a regular or a non-aerodynamically designed vehicle.

FIG. 1A illustrates a vehicle 10 with a viscous drag reduction apparatus 100 according to certain aspects of a present disclosure. The viscous drag reduction apparatus 100 can be a device mounted on a roof of a vehicle or other surfaces of the vehicle experiencing substantial drag forces to reduce the effect of viscous drag resistance when the vehicle is moving.

The viscous drag reduction apparatus 100 includes one or more belts and a plurality of rollers. For example, a first belt 101, and a first pair of rollers 102 and 103 (referred as rollers 102 and 103 hereinafter). The first belt 101 (also referred as belt 101 hereinafter) is wrapped around the first rollers 102 and 103. Alternatively or in addition, the viscous drag reduction apparatus 100 can include a second belt 111 (also referred as belt 111 hereinafter) wrapped around second pair of rollers 112 and 113 (referred as rollers 112 and 113 hereinafter), and a third belt 121 (also referred as belt 121 hereinafter) wrapped around third pair of rollers 122 and 123 (referred as rollers 122 and 123 hereinafter). The present disclosure is not limited to a number of belts and rollers. The number of belts and rollers can depend on the size of a vehicle, and the length of the belt, as can be understood by a person skilled in the art. For example, FIG. 1C illustrates a top view of the viscous drag reduction apparatus 100 with only one belt 101.

Figure 1B:
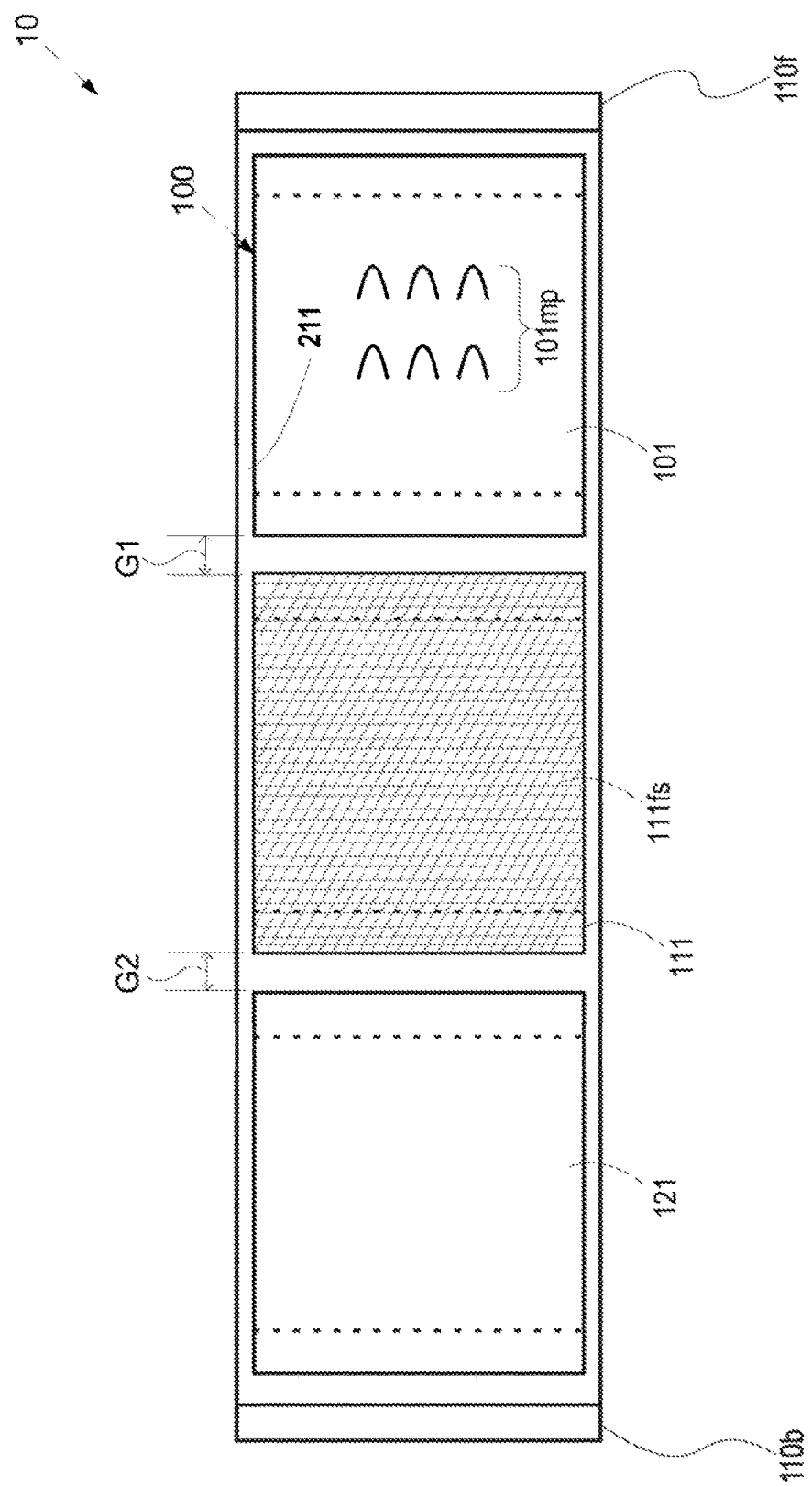
FIG. 1B is a top view of the vehicle with the viscous drag reduction apparatus in FIG. 1A according to certain aspects of the present disclosure.
Figure 1C:
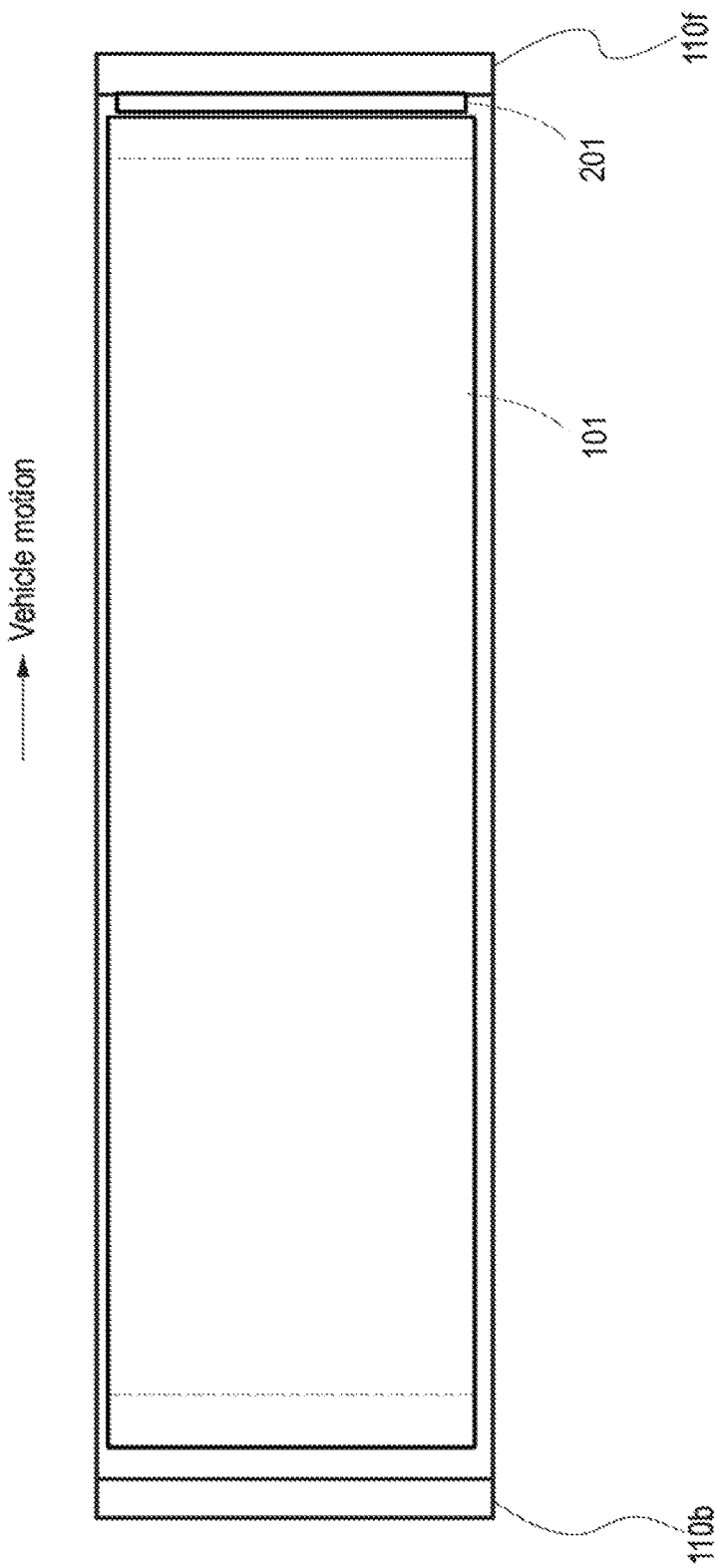
FIG. 1C is top view of the vehicle with a variation of a viscous drag reduction apparatus according to certain aspects of the present disclosure.

Referring to FIGS. 1A and 1B, the belts 101, 111 and 121 can be made of a flexible material having a surface that generates frictional forces when air flows over the flexible surface. Example materials include rubber, ethylene propylene diene terpolymer, Modified Bitumen Membrane, vinyl, Chlorinated Polyethylene (CPE), nylon, ethylene-vinyl acetate (EVA) foam, poly-vinyl chloride (PVC) and other plastic sheeting such as Acrylonitrile-Butadiene-Styrene. Optionally, one or more of the belts 101, 111, 121 can include frictional surfaces (e.g., friction surface 111*fs* in FIG. 1B), micro pockets (e.g., micro pockets 101*mp* in FIG. 1B) or a combination thereof. In FIG. 1B, the friction surface 111*fs* and/or the micro pocket 101*mp* can provide extra traction for the air to push the belt 111 or 101. The micro pockets can be open on one side so they inflate when the air flows into the micro pockets, and deflate when there is no air flow. For example, the micro pockets 101*mp* can catch air flowing at the top of the belts 101 generating additional force to rotate the belt 101 about the rollers, and the micro pockets 101*mp* can deflate at the bottom (i.e. adjacent to the top surface of a recessed roof 110) of the belt 101. Such micro pockets can serve as additional frictional element that increase viscous force generated at the top of the belt and hence aid in faster rotation of the belts. The faster rotation of the belt can be further used to produce electric energy via a generator that can be used to charge a battery.

Furthermore, as shown in FIG. 1D illustrating a cross-section of a multilayered belt 101', the multilayered belt 101' may be used with a bottom layer 101*bl* that serves as a substrate and an upper layer 101*ul* that is laminated to the bottom layer 101*bl*. The upper layer 101*ul* is laminated to the bottom layer through the application of adhesive in array of physically separated dots or strips. This allows for micro air channels 101mc to be present between the adhesive dots or strips. When air is urged into the air channels, the air pressure pushes the unattached portions of the upper sheet to expand, and create a dynamic micro texture, such that the friction over top of the top sheet is higher at higher vehicle velocities, and lower at lower velocities. Alternatively, as opposed to inflating the micro air channels 101mc with ambient air that is forced between the top sheet and the substrate as the vehicle moves, the inflation/deflation of the air channels 101mc can be controlled by a processor-controlled air pump 630, which controllably forces air between the sheets under direction of a programmed processor (e.g. CPU 600 in FIG. 6).

Referring to FIG. 1B, the belts 101, 111, and 121 can be arranged in-line, according to one example. Such in-line arrangement comprises the first belt 101 and the second belt 111 separated by a first gap G1, and the second belt 111 and the third belt 121 separated by a second gap G2. The gaps G1 and G2 ensure independent rotation of the belts 101, 111 and 121 around the respective rollers. As the belts 101, 111, and 121 can rotate independently, the rotation of the first belt 101 does not interfere with the rotation of the second belt 111, and the second belt 111 does not interfere with the rotation of the third belt 121. Moreover, the first belt 101 can rotate at different speed than the speed of the second belt 111 (or the third belt 121).

Within the in-line arrangement, a unit including the first belt 101 and the first rollers 102 and 103 placed closest to a roof front end 110f of the vehicle 10 are referred as a leading unit. The roof front end 110f of the recessed roof 110 can have a profiled surface 110p (also referred as a leading edge 110p) on a front side and a flat surface 110fs at a back side. The profiled surface 110p (or the leading edge 110p) intersects the flat surface 110fs to form an apex 110a. The apex 110a can represent a roofs top line. The profiled surface can aid in generating a smooth air flow entering the leading unit, while the flat surface allows installation space for the leading unit. The height of the front end 110f can be approximately similar to the height of the leading unit. The leading unit (or the viscous drag reduction apparatus 100 in general) is said to be "recessed" relative to the top of the front end 110f, thus maintaining the height of the vehicle approximately unchanged. An amount of recess of the inset portion of the roof of the vehicle is less than a height of the viscous drag reduction apparatus 100.

A unit including the third belt 121 and the third rollers 122 and 123 placed closer to a roof back end 110b of the vehicle 10 are referred as a trailing unit. The roof back end 110f of the recessed roof 110 can have a profiled surface on a back side and a flat surface at a front side. The profiled surface can to generate a smooth air flow leaving the trailing unit, while the flat surface can allow installation space for the trailing unit. The height of the front end 110f can be approximately similar to the height of the leading unit. The trailing unit (or viscous drag reduction apparatus 100 in general) is said to be "recessed" relative to the top of the back end 110b (or front end 110f). The front end 110f and the back end 110b along with the recessed roof 110 create a rectangular pocket within which one or more of the leading unit, the trailing unit, or additional similar units can be installed in a recessed manner.

The other belts (e.g., belt 111) and corresponding rollers (e.g., rollers 112 and 113) which are disposed between the leading unit and the trailing unit are referred as middle units. The number of middle units can depend on the overall length of the vehicle 10. Generally, the leading unit including the first belt 101 may rotate faster than the trailing unit including the third belt 121, since the leading unit can experience a higher air flow rate and/or higher air velocity compared to at the trailing unit. Thus, a variable air profile having an air velocity or air flow rate can be generated around the recessed roof 110 of the vehicle 10. Such variable air profile may decrease the drag resistance from front to back of the vehicle 10. In another embodiment, discussed with respect to FIG. 4, motor assisted rotation of belts can be used to rotate the belts 101, 111 and 121. The motor can be configured to rotate all the belts at a similar speeds or different speeds, thus generating a uniform air flow profile. A uniform air flow profile may be desirable to generate a laminar flow to prevent excess turbulence from generating undesirable vortex around the belts 101, 111, and 121.

Figure 4:
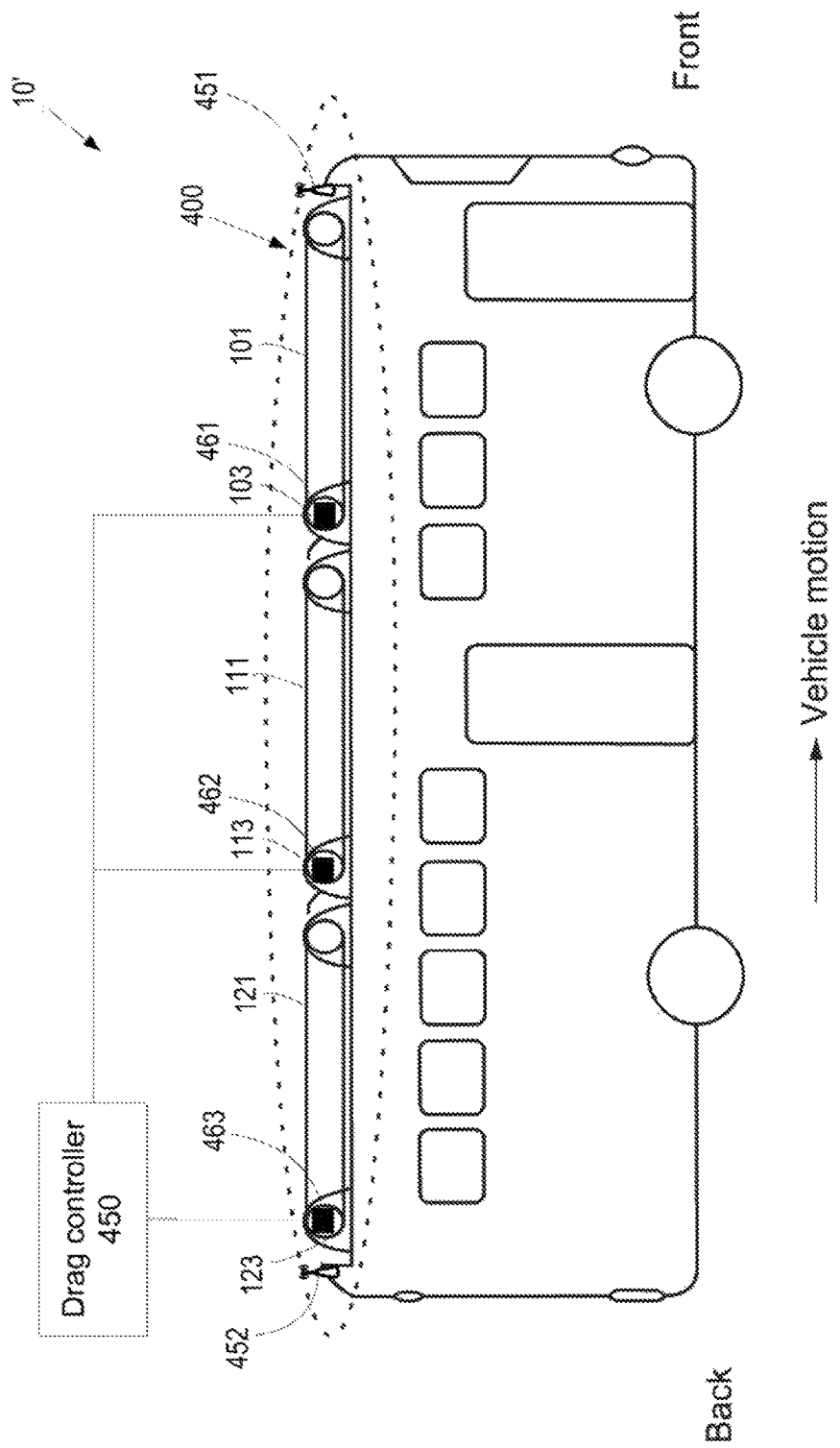
FIG. 4 illustrates a vehicle with a viscous drag reduction apparatus controlled by a drag controller according to certain aspects of a present disclosure.

The rollers 102, 103, 112, 113, 122, and 123 can be cylindrical shafts supported by bearings that allow free rotation of the rollers. In operation, the rollers 102, 103, 112, 113, 122, and 123 rotate in response to the viscous drag forces or air speed acting on the belts 101, 111, and 121 connected to the respective rollers 102, 103, 112, 113, 122, and 123. In another embodiment, the rollers can be driven by motors as illustrated in FIG. 4.

Referring back to FIG. 1A, the viscous drag reduction apparatus 100 is installed on a recessed roof 110 of the vehicle 10. A flat roof of the vehicle 10 is recessed to accommodate the viscous drag reduction apparatus 100 without increasing a height of the vehicle 10. However, the present disclosure is not limited to a vehicle with a recessed roof. Alternatively, a flat roof can be retro-fitted with the viscous drag reduction apparatus 100, although it may increase the total height of the vehicle 10, as can be understood by a person skilled in the art. Furthermore, the viscous drag reduction apparatus 100 can be surrounded by a covering (not illustrated but similar to the roof front end 110f and the roof back end 110b) at a front and a back of the vehicle 10 to deflect or direct the air flow on to the leading unit.

Figure 2:
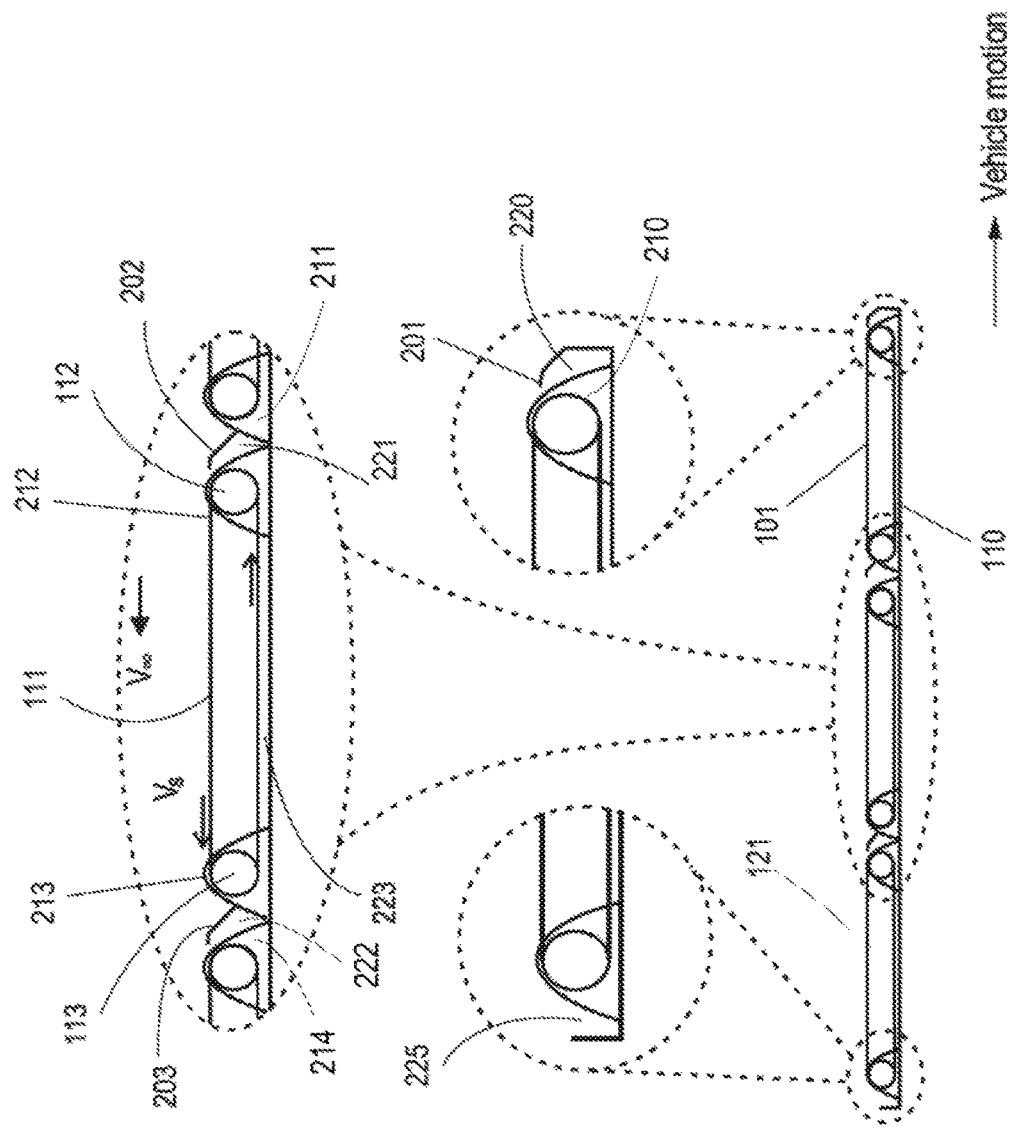
FIG. 2 illustrates details of the viscous drag reduction apparatus according to certain aspects of the present disclosure.

The details of the viscous drag reduction apparatus 100 are further illustrated in FIG. 2. In FIG. 2, the viscous drag reduction apparatus 100 includes the first belt 101 supported by the rollers 102 and 103, the second belt 111 supported by the rollers 112 and 113, and the third belt 121 supported by the rollers 122 and 123. The rollers are further supported by fixed supports containing bearings. For example, the roller 112 is supported by a bearing support 212 and the roller 113 is supported by another bearing support 213. The bearing supports 212 and 213 are fixed to the recessed roof 110 of the vehicle 10. Similarly, the rollers 102, 103, 122, and 123 are supported by bearing supports 210, 211, 214 and 215 respectively, similar to bearing supports 212 and 213.

The viscous drag reduction apparatus 100 can further include one or more reverse flow cover such as a first reverse flow cover 201, a second reverse flow cover 202, and a third reverse flow cover 203. A reverse flow cover can be any component that prevents an air back flow, which is the air flowing from below the belt to interact with the air flowing at the top of the belt. The shape of the reverse flow cover 201 (or 202 and 203) being angled at less than 90 degrees with respect to a supporting surface (top surface of the roof 110) and tilting in a backward direction with respect to a moving direction of the vehicle. Furthermore, the shape of the reverse flow cover 201 can have multiple facets, and includes one facet that is between 20 degrees and 70 degrees with respect to the supporting surface. The supporting surface is an inset portion of the recessed roof 110 of the vehicle, the supporting surface being lower than an apex of a leading edge of the roof, where the leading edge is at a front of the vehicle. In one implementation, a supporting surface can be a separate plate having fixtures to attach the viscous drag reduction apparatus 100 and configured to install on top of the roof 110.

As the air flow at the bottom of the belt interacts with the air flow at the top of the belt, the belt speed may decrease since the air flow at the bottom of the belt is in an opposite direction to air flow at the top of the belt. Furthermore, the air flow interaction between adjacent belts can generate turbulence or affect a laminar flow at the top of the belt, which are both undesirable conditions since they may obstruct or slow down the rotation of the belt. Thus, the reverse flow covers 201, 202 and 203 can block the air flow from an adjacent belt or deflect the air flowing at a top of the belts improving the air flow pattern and efficiency of the vehicle 10.

In operation, an example air flow interaction is illustrated with respect to the belt 111. At the top of the belt 111 (or 101 or 121), the air flows causes the belt 111 to move from the front towards the back (anticlockwise). As the belt 111 moves, the air moves along with the belt and enters into a bottom channel 223 between the belt 111 (or 101 or 121) and the recessed roof 110. The bottom channel 223 can be broadly defined by a space between the belt 111 and the top surface of the vehicle 10. As the belt 111 continues to move, the air can move from the bottom channel 223 to interact with the air flow entering at the front of the belt 111. As such the air flowing from the bottom channel 223 can interfere with the air flow pattern at front (i.e., around the bearing support 212). To prevent such air flow interference at the front of the belt 111 around the bearing support 212, the reverse flow cover 202 is placed within a gap 221 present between the bearing supports 212 and 211. The reverse flow cover 202 is firmly attached to the bearing support 211 extending towards the bearing support 212, thus partially or completely preventing the air flow from the bottom channel 223 from interacting with the air flow at the top of the belt 111.

In addition or alternatively, a reverse flow cover 201 can be attached to the recessed roof 110 within a gap 220 formed between the bearing support 210 and a front end of the recessed roof 110. The reverse flow cover 201 can prevent the air from the gap 220 from interacting with the air flow at the front of the belt 101. Furthermore, in addition or alternatively, a reverse flow cover 203 can be attached to bearing support 213 within a gap formed between the bearing support 213 and 214. The reverse flow cover 203 can prevent the air within the gap 222 from interacting with the air flow at the front of the belt 101. However for the belt 121 (or the trailing unit), a reverse flow cover may not be placed at end of the belt 121. So, the gap 225 between the belt 121 and the top surface of the vehicle 10 is open and any air flow through the gap 225 can actually facilitate the motion of the viscous drag reduction apparatus 100.

The relationship between the air flow velocity, the belt speed and drag forces is further discussed in detail as follows. As the vehicle 10 moves through the air, there will be a relative velocity of the vehicle with respect to the air which can be represented by the relative air velocity $V_\infty$. Considering the air to be stationary, the relative air velocity $V_\infty$ will be the velocity of the vehicle 10, or considering the vehicle 10 to be stationary the relative air velocity $V_\infty$ will be the velocity of the air through the vehicle 10 in the opposite direction. Because of the relative air velocity $V_\infty$ and the friction between the air and the belt 111, a viscous drag force is generated which will cause the belt 111 to move in the direction of the air. The movement of belt 111 can be represented by a belt speed $V_s$. The direction motion of the belt 111 will be the same as the direction of the relative air velocity $V_\infty$. As the belt 111 starts rotating about the rollers 112 and 113 the speed of the belt 111 within the bottom channel 223 will also be approximately same as the belt speed $V_s$.

As the air may enter into the bottom channel 223 through the gap 221, the air flow interaction within the gap 221 can decelerate the rotating motion of the belt 111, since the air entering from the gap 221 will be moving in opposite direction to the motion of the belt within the bottom channel 223. In order to avoid this situation, the reverse flow cover 202 can be placed which can be attached to the bearing support of the adjacent belt (i.e., the belt 101).

Considering a case of a vehicle without the viscous drag reduction apparatus 100 (or 400). For such vehicle, the drag force $F_d$ for an area A of the roof of the vehicle will be as follows:

$$F_d = C_d(\tfrac{1}{2})\rho V_\infty^2 A \quad (1)$$

where, $C_d$ is the coefficient of drag, and $\rho$ is the density of air.

For the case of the vehicle 10 with viscous drag reduction apparatus, the relative velocity will change. The relative velocity at the top of the belts 101, 111 and 121 will be $(V_\infty - Vs)$. However, considering the air within the bottom channel 223 to be stationary, the relative velocity within the bottom channel 223 will be $V_s$. Thus, the drag force $F_d'$ for the vehicle 10 with viscous drag reduction apparatus 100, considering a total area of the belts approximately similar to the roof area A, will be as follows:

$$F_d' = C_d(\tfrac{1}{2})\rho(V_\infty - V_s)^2 A + C_d(\tfrac{1}{2})\rho V_s^2 A \quad (2)$$

Using equations (1) and (2), the percentage reduction in the drag resistance can be calculated as follows:

$$\%(\Delta F_d/F_d) = 2\{(V_s/V_\infty)^2 - (V_s/V_\infty)\} \times 100 \quad (3)$$

Figure 3:
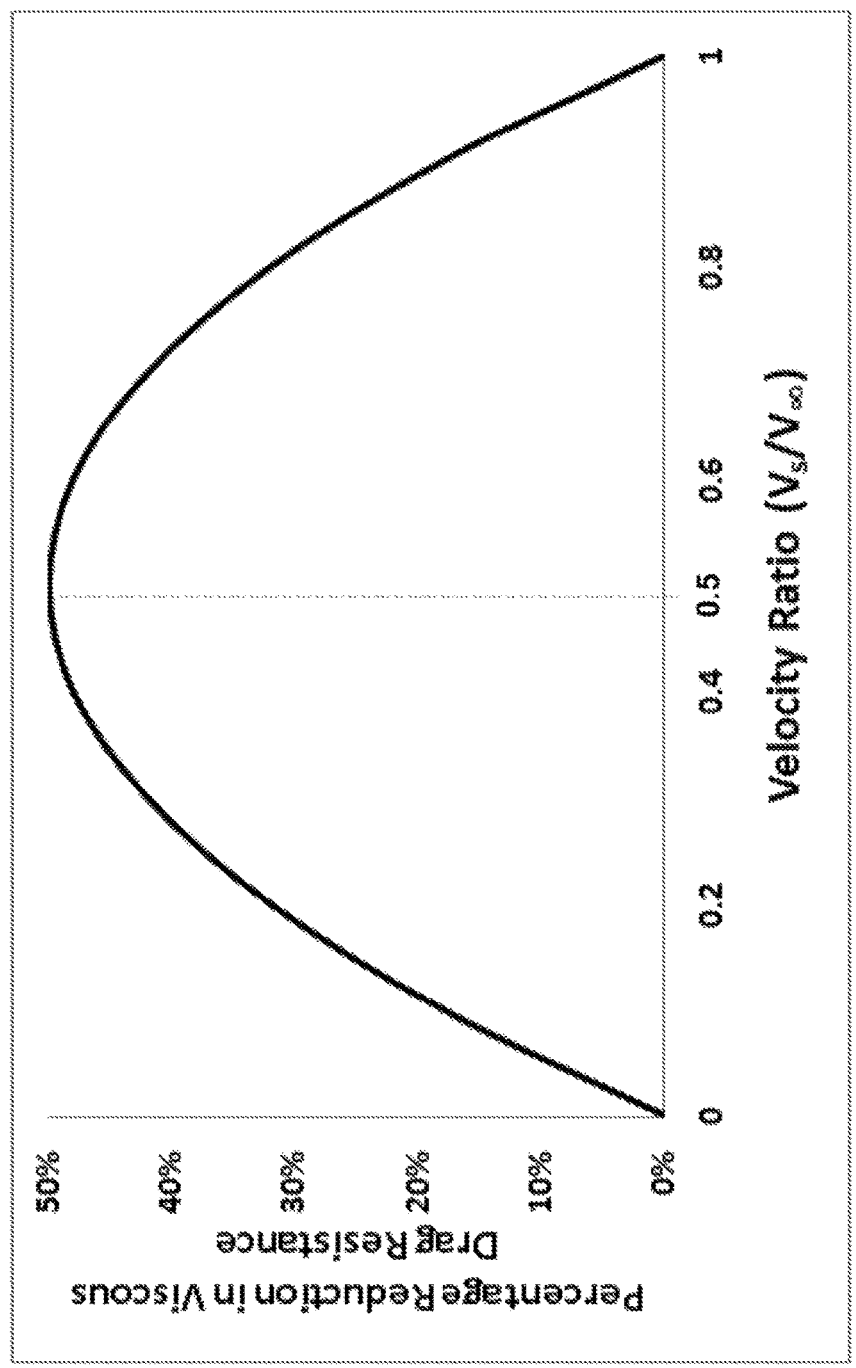
FIG. 3 is a graph showing a percentage reduction in the viscous drag resistance as a function of a velocity ratio ($V_s/V_\infty$) according to certain aspects of the present disclosure.

Equation (3) is plotted as shown in FIG. 3. The plot, in FIG. 3, shows a relationship between the percentage reduction in viscous drag resistance and the velocity ratio $(V_s/V_\infty)$. When the velocity ratio $(V_s/V_\infty)$ is approximately 0.5, the viscous drag resistance can be reduced by approximately 50% with the use of viscous drag reduction apparatus 100 (or 400) on vehicles. The velocity ratio $(V_s/V_\infty)$ is preferable to be within a range of 0.45 to 0.55, as a maximum percentage reduction in viscous drag resistance can be observed in such range.

It should be noted that the results in FIG. 3 represent a worst case scenario where the air within the bottom channel 223 is assumed to be stationary. However, in practice the air in the bottom channel 223 will not be stationary rather it will move in the direction of the belt 111 (or 101 or 121) causing the relative velocity within the bottom channel 223 to reduce, hence a further reduction in overall viscous drag resistance may be possible. The reduction in viscous drag resistance would effectively result in the reduction of fuel consumption of the vehicle 10 making the vehicle 10 energy efficient.

The viscous drag reduction apparatus 100 can be installed on any surface of a vehicle 10, preferably to be installed on surfaces which are not used for functioning of the vehicle or surfaces experiencing high viscous drag forces. For example, in case of a bus, a front surface has head lights, other indicators and front window that make such surfaces may be unsuitable for installation of the viscous drag reduction apparatus 100. Similarly, two side surfaces of the bus have access to storage areas, doors, windows, etc. and a back face may have access to the engine of the bus. Hence, a top surface of the bus may be preferred, as the top surface may not be used for viewing outside or have any access doors. Thus, for the case of a bus as a transportation vehicle, the most appropriate location to install the viscous drag reduction apparatus 100 is at the top surface of the bus. The belts 101, 111, and 121 can be made up of light rubber material with adequate elastic properties. The rollers 102, 103, 112, 113, 122, and 123 the corresponding bearing supports can be made up of light weight steel, or aluminum, and the reverse flow covers 201, 202, and 203 can be made of light and strong plastic material.

The present disclosure is not limited to freely rotating belts, as discussed above. In one embodiment of the present disclosure, the belts can be driven by a motor controlled by a drag controller. FIG. 4 illustrates a transportation vehicle with a viscous drag reduction apparatus 400 having motors controlled by a drag controller 450 according to certain aspects of a present disclosure. The viscous drag reduction apparatus 400 has a similar construction as the viscous drag apparatus 100, but in addition includes one or more wind speed sensors 451 and 452, one or more motors 461, 462 and 463, and the drag controller 450.

The motors 461, 462, and 463 can be electric motors controlled by the drag controller 450 based on the wind speed measured by the wind speed sensor 451 (or 452). The motor 461 can drive the belt 101 via one of the rollers (e.g., roller 103) supporting the belt 101, the motor 462 can be drive the belt 111 via one of the rollers (e.g., roller 113) supporting the belt 111, and the motor 463 can be drive the belt 121 via one of the rollers (e.g., roller 123) supporting the belt 121. The speed of the belt 101 (or 111 or 121) can be controlled via the motor 461 (or 462 or 463) based on the wind speed measured at a top of the vehicle 10' by the sensor 451 (or 452).

The drag controller 450 can be configured to receive the wind speed at the top of the vehicle 10' and a vehicle speed, and using the wind speed to determine an optimum speed of the belts 101 (or 111 or 121) based on the equations 2 and 3 and the plot in FIG. 3 to achieve maximum drag reduction. The drag controller may also be used to actively pump air into the micro air channels between the sheets that form the belts, as was previously discussed, so as to adaptively control the amount of air friction experienced by the belt(s). The structure of the drag controller 450 is discussed in detail with respect to FIG. 6 and an example control process implemented in the drag controller 450 is discussed in FIG. 5.

Figure 5:
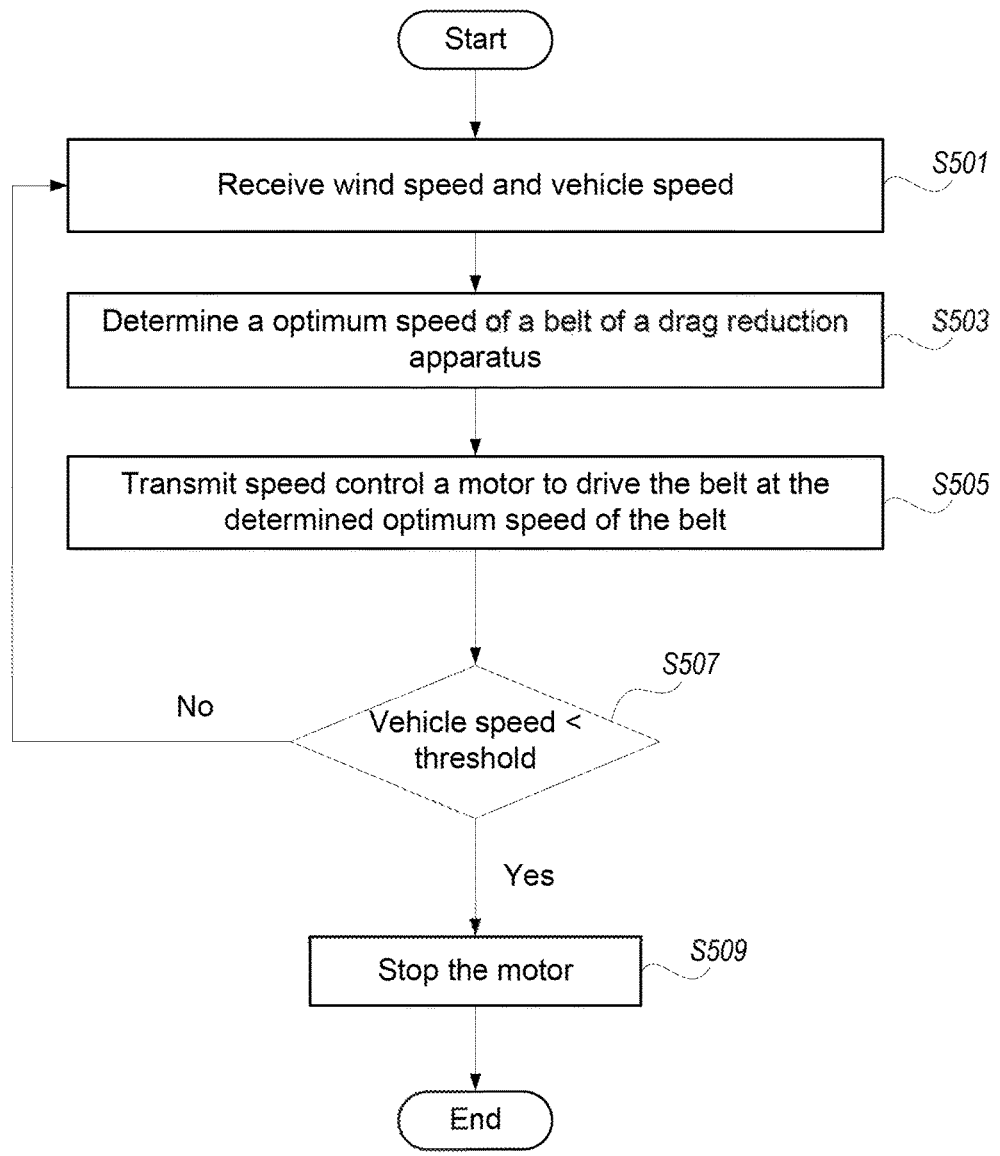
FIG. 5 is a flow chart for drag controller according to certain aspects of a present disclosure.

In FIG. 5, the process starts when the vehicle 10' is set in motion. In step S501, the drag controller 450 receives the wind speed from the wind speed sensors 451 and 452, and a vehicle speed from the vehicle 10'. In step S503, the drag controller 450 determines an optimum speed of the belts 101, 111, and 121 of the drag reduction apparatus 400. The optimum speed Vs of the belts can be computed using the equations 2 and 3 such that the velocity ratio ($V_s/V_\infty$) is maintained at approximately 0.5, preferably within 0.45-0.55, as discussed earlier in the disclosure. Maintaining the velocity ratio ($V_s/V_\infty$) allows the drag reduction apparatus 400 to operate at a maximum efficiency, which in turn maintains a high fuel efficiency of the vehicle 10'. Further, in step S505, the drag controller 450 sends a speed control to the motor 461 (or 462 or 463) to drive the belt 101 (or 111 or 121) at the determined optimum speed.

Further, in step S507, the drag controller 450 determines whether the vehicle 10' is travelling at a vehicle speed less than a speed threshold. The speed threshold can be a pre-determine speed, preferably in within a range of 0 to 10 miles per hour (mph). The speed threshold refers to a vehicle speed below which the rotation of the belt may be unwarranted because at low vehicle speed the friction generated at the belts may not produce sufficient viscous drag resistance to justify the energy spent in running the motor 461 (or 462 or 463). If the vehicle speed is less than the threshold, the motor 461 (or 462 or 463) is stopped, in step S509. However, if the vehicle speed is substantially similar to or above the threshold, the drag controller 450 continues to step S501, thus continuously adjusting the belt speed depending on a changing vehicle speed and the wind speed. Such a continuous belt speed control allows the drag reduction apparatus 400 to operate at optimum level resulting in a high fuel efficiency of the vehicle 10'.

In the present disclosure, the viscous drag reduction apparatus 100 (and 400) are configured to reduce the fuel consumption of transportation vehicles via reduction in viscous drag resistance acting on the vehicle. The percentage of reduction in the viscous drag resistance of the vehicle can depend on the ratio of velocity of the belts 101, 111, and 121 to the speed of the vehicle. The design of the viscous drag reduction apparatus 100 (and 400) for a vehicle can also depend on several factors such as a shape and size of the vehicle, a percentage of area suitable for installing the apparatus, a contribution of the viscous drag resistance within the overall drag resistance for the vehicle, number of belts, a motor speed, and other similar factors. Hence, variations in design of the viscous drag reduction apparatus 100 (and 400) is possible as can be understood by a person skilled in the art, and is not limited to the configurations illustrated in the present disclosure.

Each of the functions of the described embodiments may be implemented by one or more controller. A controller includes a programmed processor (for example, a CPU 600 in FIG. 6), as a processor includes circuitry. The controller may also include devices such as an application specific integrated circuit (ASIC) and conventional circuit components arranged to perform the recited functions.

Figure 6:
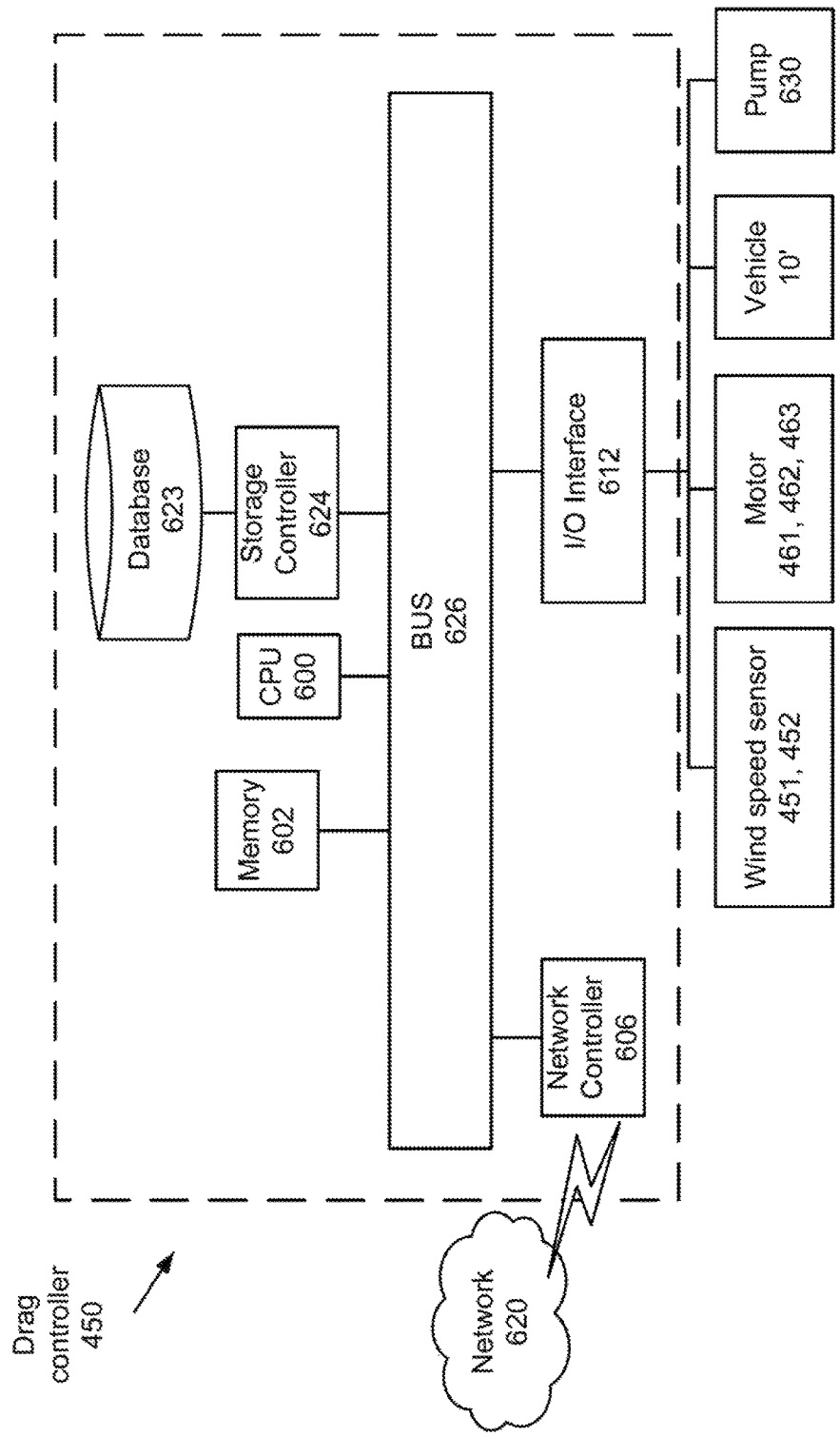
FIG. 6 is a detailed block diagram illustrating an exemplary drag controller according to certain embodiments of the present disclosure.

FIG. 6 is a detailed block diagram illustrating an exemplary drag controller 450 according to certain embodiments of the present disclosure. In FIG. 6, the drag controller 450 includes a CPU 600, a database 623, and an interface 612 that sends/receives signal or inputs from wind speed sensors 451, 452, motors 461, 462, and 463, the pump 630 and vehicle 10'. In one embodiment, the drag controller 450 can receive signals from wind speed sensors 451, 452, motors 461, 462, and 463, and vehicle 10 via a network 620. Based on the sensor data, the drag controller can send signals to control the motors 461, 462, 463, and the pump 630, as discussed throughout the present disclosure.

The CPU 600 can perform the processes described in the present disclosure. The process data and instructions may be stored in a memory 602. These processes and instructions (discussed with respect to FIG. 5) may also be stored on a storage medium disk such as a hard drive (HDD) or portable storage medium or may be stored remotely.

Further, the claimed advancements may be provided as a utility application, background daemon, or component of an operating system, or combination thereof, executing in conjunction with CPU 600 and an operating system such as Microsoft Windows, UNIX, Solaris, LINUX, Apple MAC-OS and other systems known to those skilled in the art.

The hardware elements in order to achieve the drag controller 450 may be realized by various circuitry elements, known to those skilled in the art. For example, CPU 600 may be a Xenon or Core processor from Intel of America or an Opteron processor from AMD of America, or may be other processor types that would be recognized by one of ordinary skill in the art.

The drag controller 450, in FIG. 6, also includes the network controller 606, such as an Intel Ethernet PRO network interface card from Intel Corporation of America, for interfacing with a network 620. As can be appreciated, the network 620 can be a public network, such as the Internet, or a private network such as an LAN or WAN network, or any others networks.

The storage controller 624 connects the storage mediums with communication bus 626, which may be an ISA, EISA, VESA, PCI, or similar, for interconnecting all of the components of the drag controller 450. A description of the general features and functionality of the storage controller 624, the network controller 606, and the I/O interface 612 is omitted herein for brevity as these features are known.

In the above description, any processes, descriptions or blocks in flowcharts should be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art.

While certain embodiments have been described, these embodiments have been presented by way of example only, and are not intended to, limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures. For example, this technology may be structured for cloud computing whereby a single function is shared and processed in collaboration among a plurality of apparatuses via a network.

What is claimed is:

1. A viscous drag reduction apparatus for a vehicle comprising:
   a pair of rollers connected to a supporting surface on a roof of the vehicle;
   a belt having a frictional surface and partially wrapped around the pair of rollers, such that the pair of rollers allow the belt to rotate in response to an air flow generated around the vehicle when the vehicle is in motion, the pair of rollers having a length in an axial direction that is at least as long as a width of the belt, an assembly of the pair of rollers and the belt being at least partially recessed with respect to a top line of the roof; and
   a reverse flow cover connected to the supporting surface of the roof of the vehicle and extending to a top of the belt so as to block an air back flow generated by the belt when rotating, the shape of the reverse flow cover being angled at less than 90 degrees with respect to supporting surface and tilting in a backward direction with respect to a moving direction of the vehicle;
   a motor connected to the pair of rollers;
   a wind speed sensor circuitry configured to measure a wind speed around the vehicle; and
   a drag controller circuitry configured to
      receive the wind speed from the wind speed sensor and a vehicle speed from the vehicle,
      determine an optimum belt speed of the belt based on the wind speed and the vehicle speed by first computing a percentage drag reduction using the wind speed and the vehicle speed, and further computing a belt speed with a maximum percentage drag reduction, wherein the optimum belt speed corresponds to a velocity ratio of 0.45-0.55, the velocity ratio defined by a ratio of the belt speed to the wind speed, and
      transmit a speed control signal to the motor based on the optimum belt speed.

2. The apparatus according to claim 1, wherein the supporting surface is an inset portion of the roof of the vehicle, the supporting surface being lower than an apex of a leading edge of the roof, where the leading edge is at a front of the vehicle.

3. The apparatus according to claim 2, wherein an amount of recess of the inset portion of the roof of the vehicle is less than a height of the viscous drag reduction apparatus.

4. The apparatus according to claim 3, wherein the reverse flow cover has multiple facets, and includes one facet that is between 20 degrees and 70 degrees with respect to the supporting surface.

5. The apparatus according to claim 1, further comprising a plurality of bearing supports attached to the supporting surface, and the pair of rollers are rotatably connected to the bearing supports.

6. The apparatus according to claim 5, wherein a reverse flow cover is attached to the bearing support.

7. A viscous drag reduction apparatus for a vehicle comprising:
   a pair of rollers connected to a supporting surface on a roof of the vehicle;
   a belt having a frictional surface and partially wrapped around the pair of rollers, such that the pair of rollers allow the belt to rotate in response to an air flow generated around the vehicle when the vehicle is in motion, the pair of rollers having a length in an axial direction that is at least as long as a width of the belt, an assembly of the pair of rollers and the belt being at least partially recessed with respect to a top line of the roof; and
   a reverse flow cover connected to the supporting surface of the roof of the vehicle and extending to a top of the belt so as to block an air back flow generated by the belt when rotating, the shape of the reverse flow cover being angled at less than 90 degrees with respect to supporting surface and tilting in a backward direction with respect to a moving direction of the vehicle,
   wherein the belt has a multilayer construction with a bottom layer attached to an upper layer with adhesives such that micro air channels are formed therebetween.

8. The apparatus according to claim 7, wherein the drag controller is further configured to dynamically inflate the micro air channels, via a pump, to adaptively control an amount of air friction experienced by the belt.

9. A method for viscous drag reduction with the viscous drag reduction apparatus of claim 1, the method comprising:

receiving, via processing circuitry, the wind speed around the vehicle from the wind speed sensor circuitry and the vehicle speed from the vehicle;

determining, via the drag controller circuitry, the optimum belt speed of the belt based on the wind speed and the vehicle speed; and transmitting, via a network, the speed control signal to the motor based on the optimum belt speed, wherein the determining of the optimum belt speed is performed by first computing a percentage drag reduction using the wind speed and the vehicle speed, and further computing a belt speed with a maximum percentage drag reduction.

10. The method according to claim 9, wherein the optimum belt speed corresponds to a velocity ratio of 0.45-0.55, the velocity ratio defined by a ratio of the belt speed to the wind speed.

* * * * *